United States Patent [19]

Onishi et al.

[11] 3,733,579

[45] May 15, 1973

[54] SENSING DEVICE FOR DIGITAL MAGNETIC MEMORY

[75] Inventors: Yoshihiro Onishi, Kokubunji; Kazuo Nakagoshi, Odawara-shi, both of Japan

[73] Assignee: Hitachi, Ltd., Tokyo, Japan

[22] Filed: Apr. 25, 1972

[21] Appl. No.: 247,330

[52] U.S. Cl. .......... 340/174.1 H

[51] Int. Cl. .......... G11b 5/02, G11b 5/44

[58] Field of Search .......... 340/174.1 B, 174.1 H

[56] References Cited

UNITED STATES PATENTS

| | | | |
|---|---|---|---|
| 3,164,815 | 1/1965 | Applequist | 340/174.1 H |
| 3,217,329 | 11/1965 | Gabor | 340/174.1 H |
| 3,573,770 | 4/1971 | Norris | 340/174.1 H |

*Primary Examiner*—Vincent P. Canney
*Attorney*—Paul M. Craig et al.

[57] ABSTRACT

A sensing device for a digital magnetic memory in which a signal sensed by a magnetic head is, after being differentiated by a differentiation circuit, supplied to a first low-pass filter by which harmonic components of the differentiated signal are eliminated therefrom. This signal is then supplied to both means for generating a first pulse signal each time the signal traverses the zero level and a second low-pass filter, the output signal of the second low-pass filter being further supplied to means for generating a second pulse signal each time the output signal of the second low-pass filter traverses the zero level. The first and second pulse signals are supplied to an AND gate to produce the logic product thereof to provide an inherent peak signal.

1 Claim, 6 Drawing Figures

Patented May 15, 1973 3,733,579

3 Sheets-Sheet 1

SENSING DEVICE FOR DIGITAL MAGNETIC MEMORY

FIELD OF THE INVENTION

The present invention relates to a sensing device for a digital magnetic memory, and more particularly to a sensing device capable of exactly discriminating between a sensed signal and noise.

DESCRIPTION OF THE PRIOR ART

As a sensed signal discriminating method for a high density digital magnetic memory such as a magnetic disc, drum or tape there is a peak detecting method. The peak detecting method utilizes the fact that the slope of a sensed signal waveform at its peak is zero. When the sensed signal waveform is differentiated, the position at which the differentiated waveform is zero corresponds to the peak position of the sensed signal waveform. At this time, if there is a considerable interval of a track at which no magnetic reversal occurs, no signal to be sensed may happen to be present in some parts thereof. Then, even if such parts would be differentiated, the derivative thereof is zero. This fact would practically provide a cause for mis-sensing. For this reason, such a recording scheme as magnetic reversal is necessarily present at each predetermined interval so that the part in which no magnetic reversal is present does not extend so long, for example an FM, PM or MFM scheme has been adopted for effecting peak detection. However, even in such a recording scheme, when the resolving power of the magnetic recording system is high, the derivative is sometimes zero at the portion which is not a peak, resulting in mis-sensing, when the pattern in which the interval of magnetic reversal is wide is sensed.

Now, an example thereof will be described with reference to FIG. 1 which shows a conventional peak sensing circuit. An output from a sensing head I is amplified by an amplifier 3 and then supplied to a differentiation circuit 3 by which the peak of the output is converted into a signal of zero level. This signal, after its harmonic components, i.e., noise is removed, is shaped by a limiter 5 and a pulser 6 into pulses. The output waveform at each part of the circuit is shown in FIG. 2. If the resolving power of the magnetic recording system consisting of a magnetic head and a magnetic recording medium is high, dips as indicated by the arrows occur in the output $O_o$ of the differentiation circuit 3, i.e., the input (FIG. 2*b*) to the limiter 5 for a pattern of low recording density (parts I and II in FIG. 2*a*). If large noise is superposed on the dips, reversals other than the recorded information as shown by dotted lines in FIG. 2*c* occur in the output of the limiter 5, and output pulses other than the recorded information as shown by dotted lines in FIG. 2*d* are produced.

To eliminate these dips from the output of the differentiation circuit a method has been known in which the low-pass filter 4 is followed by an additional low-pass filter 4′ having characteristics of a moderate slope which is not so steep as those of the low-pass filter 4 to reduce harmonic components. According to this method a limiter input as shown by a dotted line in FIG. 3*a* (the solid line is the input when the low-pass filter 4′ is absent) is available. However, at the parts where the recording density is varied the shift of the positions of the input (dotted line) which intersect the zero level line from the inherent positions which correspond to the current reversals (peak-shift) becomes large. In this case, if the peak shift is larger than a certain amount, there is a possibility of misdiscrimination.

Thus, the conventional system tends to be influenced by noise when the recording density is low on the one hand, while on the other hand if the conventional system is made to be little influenced by noise by incorporating the additional low-pass filter 4′ therein, there is a possibility of misdiscrimination.

SUMMARY OF THE INVENTION

An object of the present invention is to provide an information sensing devise having the advantages of both conventional system with and without the additional low-pass filter 4′ which are further effectively advanced.

As stated above, in the conventional system without the additional low-pass filter 4′, erroneous peaks are sensed due to noise, while the intrinsic peaks are sensed without fail. On the other hand, in the conventional system with the additional low-pass filter 4′, peak shifts occur, while noise is eliminated without fail. Consequently, according to the present invention, the detected signals from both conventional systems with and without the additional low-pass filter 4′ are supplied to an AND gate to derive therefrom only the intrinsic peak signals.

DESCRIPTION OF THE PREFERRED EMBODIMENT

Figure 1:
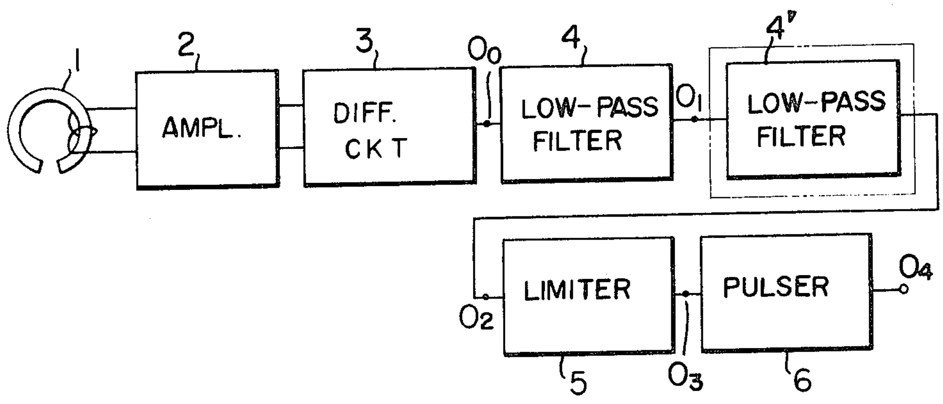
FIG. 1 PRIOR ART
FIG. 1 is a block diagram of a conventional sensing device.
Figure 2:
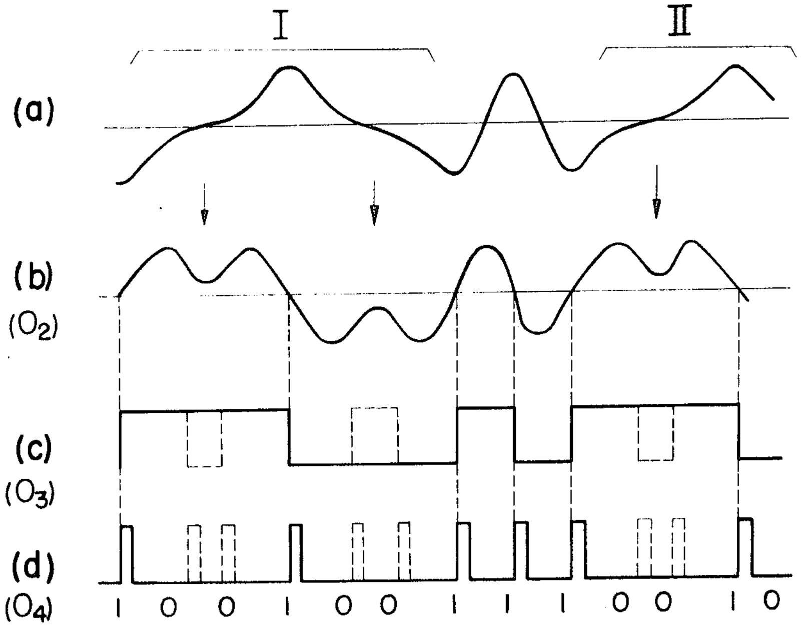
FIG. 2 PRIOR ART
FIG. 2 and 3 are waveforms at various parts of the device of FIG. 1.
Figure 3:
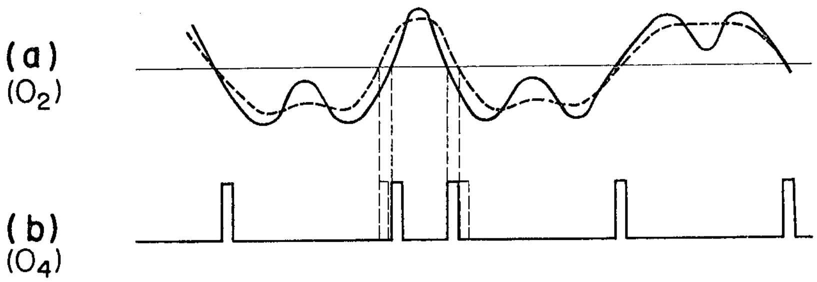
FIG. 3 PRIOR ART

An embodiment of the present invention will be described with reference to FIG. 4. A magnetic head 1, an amplifier 2, a differentiation circuit 3, a low-pass filter 4, a limiter 5 and a pulser 6 are similar to those in FIG. 1. After the low-pass filter 4 the circuit is divided into two branches. One branch is composed of a series connection of the limiter 5, the pulser 6 and a delay circuit 12, and the other branch comprises a series connection of a low-pass filter 4′, a limiter 13 and a gate pulser 14. The outputs of the delay circuit 12 and the gate pulser 14 are coupled to the inputs of an AND gate 15.

The gate pulser 14 is a device for producing a signal of a constant duration from a shifted peak signal produced by the low-pass filter 4′ and shaped by the limiter 13. The constant duration is set at a value greater than $2\Delta T$ and smaller than the bit interval, for example, where $\Delta T$ is the peak shift.

The delay circuit 12 is such a device as delays the output signal of the pulser 6 by an amount $T_D$ somewhat greater than the shift time T of the low-pass filter 4′.

Figure 4:
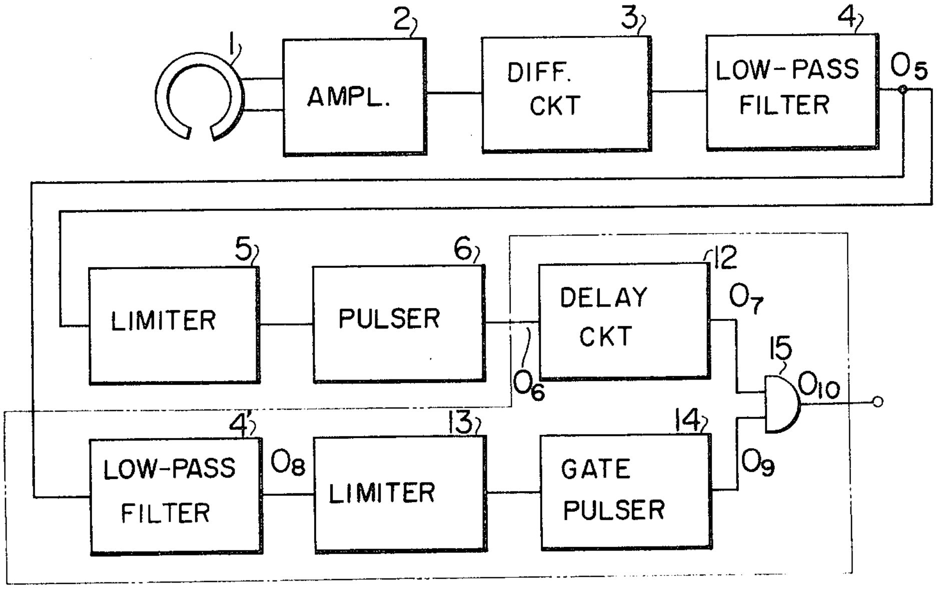
FIG. 4 is a block diagram of an embodiment of the present invention.
Figure 5:
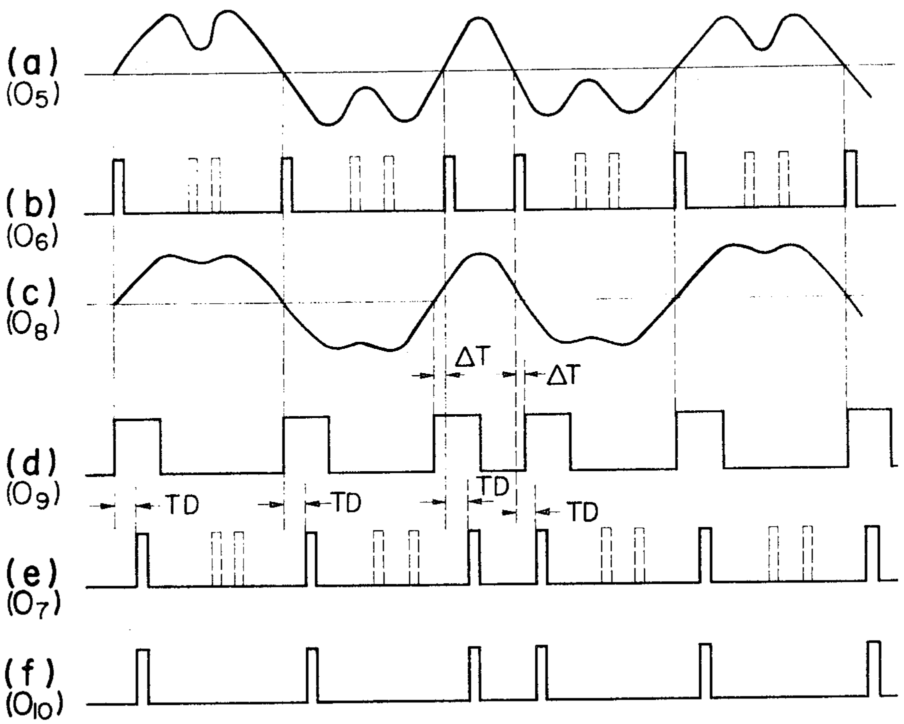
FIG. 5 is waveforms at various parts of the device of FIG. 4.

The waveformes at various parts of the circuit of FIG. 4 are shown in FIG. 5. In the waveform $O_5$ of the output of the low-pass filter 4, the peak shifts are slight as shown at (*a*), but dips are produced at the parts where the recording density is low. If noise (not shown) is superposed on such parts, pulses other than the inherent signal as shown by dotted lines at (*b*)in FIG. 5 happen to be produced in the output $0_6$ of the pulser 6.

On the other hand, when the output of the low-pass filter 4 is passed through the low-pass filter 4' which has a moderate slope, the output signal $0_8$ shown at (*c*) in FIG. 5 is produced. In this signal $0_8$, peak shifts occur though the degree of dip is reduced.

When the output $0_6$ of the pulser 6 is supplied to the delay circuit 12, an output signal $0_7$ shown at (*e*) in FIG. 5 is produced, while the output signal $0_8$ of the low-pass filter 4' is converted into an output signal $0_9$ as shown at (*d*) in FIG. 5 after having passed through the limiter 13 and gate pulser 14. When these output signals $0_7$ and $0_9$ are supplied to the AND gate 15, an output signal $0_{10}$ as shown at (*f*) in FIG. 5 is produced. As is evident from the output signal $0_{10}$ shown at (*f*) in FIG. 5, noise pulses as shown by dotted lines are completely eliminated.

The shift time ΔT of the peak is determined experimentally, and for setting the shift time the kind of noise is taken into consideration. The characteristics of the low-pass filters 4 and 4' are also determined experimentally, and at that time the characteristic of the noise is taken into consideration as for the shift time.

An example of the application of the present invention to the modified-NRZI system disclosed in copending U.S. Pat. application Ser. No. 11,327 filed Sept. 17, 1971 entitled "Memory System" will be described. Though the following description will be restricted only to the case of the magnetic disc, it is to be noted that the present invention can likewise be applicable to the cases of other devices.

If it is assumed that the frequency for the case where all bits are "1" is 3.6 MHz and that for the case of "100100" is 1.2 MHz, the first low-pass filter 4 may well be such a one as faithfully passes the signal waveform and eliminates adverse noise to improve the signal-to-noise ratio. Consequently, a filter having a sharp attenuation characteristic of a cut-off frequency of 6 MHz is sufficient assuming that the necessary band is about 1.5 times as high as the frequency 3.6 MHz for the case where all bits are "1".

Figure 6:
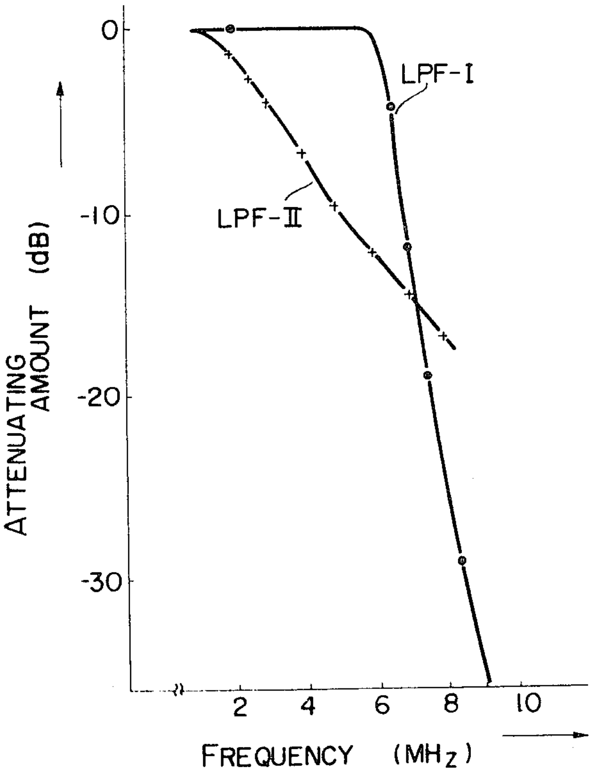
FIG. 6 is frequency characteristics of the first low-pass filter (LPF-I) and the second low-pass filter (LPF-II).

On the other hand, the largest dip occurs when bits are "100" and the frequency is 1.2 MHz. The dip is largely due to the third harmonic component 3.6 MHz contained in the signal of 1.2 MHz. Consequently, it is necessary for removing the dip to attenuate the component 3.6 MHz. For this purpose, as the second low-pass filter 4', a filter having a relatively moderate attenuation characteristic may be employed to attenuate the component 3.6 MHz by about 6 dB. The attenuation characteristics LPF-I and LPF-II of the first and second low-pass filters 4 and 4', respectively, are shown in FIG. 6. As the delay circuit 12 one having a delay time of 120 n sec which compensates for the delay including the delay (80 n sec) due to the second low-pass filter 4' was employed. Consequently, for the circuit of FIG. 4 $T_D = 40$ n sec. The pulse duration of the gate pulser 14 was 80 n sec.

In the circuit of such a construction, the increment ΔT of the peak shift due to the second low-pass filter 4' was $\Delta T = \pm 15$ n sec according to an experiment. If the inherent peak shift +50 n sec to −30 n sec due to the recording pattern is added thereto, the overall peak shift becomes +65 n sec to −45 n sec, the ratio of which to the predetermined information discrimination width 140 n sec (±70 n sec) is large, and there is a possibility of causing discrimination error. However, according to the construction of the present invention, the dip could substantially completely be eliminated, and yet the discrimination error also could completely be obviated by introducing delay operation. This fact greatly depends on the characteristics of the noise source. As the noise source, one due to the loss resistance component of the magnetic head, amplifier noise, one due to the unevenness of the recording medium are considered. While the former two can relatively easily be eliminated the circuit operation, the last one can only insufficiently be eliminated by the circuit operation. This is because the last one is strongly influenced by the characteristic of the pattern. According to the experiments by the inventors on magnetic disc, the noise occured predominantly at parts of low recording density ("00") and during continual absence of record. Consequently, if the noise is superposed on the dipped portions, discrimination error is caused to occur. However, according to the present invention which has taken these circumstances into consideration, the noise can almost completely be eliminated.

We Claim

1. A sensing device for a digital magnetic memory comprising a digital magnetic memory, a magnetic head for sensing a signal stored in the memory a differentiation circuit for differentiating the sensed signal to produce the derivative of the sensed signal, a first low-pass filter for receiving a signal from the differentiation circuit and eliminating harmonic components therefrom, means for receiving a signal from the first low-pass filter and producing a first pulse signal each time the last named signal traverses the zero level, means for delaying the first pulse signal by a predetermined time to produce a delayed pulse signal, a second low-pass filter for receiving an output signal from the first low-pass filter and further eliminating harmonic components therefrom, means for producing a second pulse signal each time the signal received from the second low-pass filter traverses the zero level, and means for forming the logical product of the delayed pulse signal and the second pulse signal.

* * * * *